US010558813B2

(12) United States Patent
Bhogal et al.

(10) Patent No.: US 10,558,813 B2
(45) Date of Patent: *Feb. 11, 2020

(54) MANAGING SHARED INVENTORY IN A VIRTUAL UNIVERSE

(71) Applicant: International Business Machines Corporation, Armonk, NY (US)

(72) Inventors: Kulvir S. Bhogal, Fort Worth, TX (US); Rick A. Hamilton, II, Charlottesville, VA (US); Clifford A. Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 944 days.

This patent is subject to a terminal disclaimer.

(21) Appl. No.: 14/991,204

(22) Filed: Jan. 8, 2016

(65) Prior Publication Data
US 2016/0125190 A1 May 5, 2016

Related U.S. Application Data

(63) Continuation of application No. 12/028,918, filed on Feb. 11, 2008, now Pat. No. 9,256,898.

(51) Int. Cl.
*G06F 21/60* (2013.01)
*G06Q 10/08* (2012.01)
(Continued)

(52) U.S. Cl.
CPC ......... *G06F 21/604* (2013.01); *G06Q 10/087* (2013.01); *G06Q 10/0875* (2013.01);
(Continued)

(58) Field of Classification Search
None
See application file for complete search history.

(56) References Cited

U.S. PATENT DOCUMENTS 6,476,830 B1    11/2002   Farmer et al.
6,514,144 B2 *   2/2003   Riendeau ................ A63F 3/081
                                              463/17

(Continued)

FOREIGN PATENT DOCUMENTS

WO           9607151        3/1996

OTHER PUBLICATIONS

Office Action (dated May 11, 2010) for U.S. Appl. No. 12/032,464.
(Continued)

*Primary Examiner* — Allen C Chein
*Assistant Examiner* — Denisse Y Oritz Roman
(74) *Attorney, Agent, or Firm* — Schmeiser, Olsen & Watts, LLP; Isaac Gooshaw

(57) ABSTRACT

A method and system for managing shared inventory in a virtual universe. A received owner request from an owner of an inventory item designates the inventory item as a shared inventory item. The owner request specifies terms and conditions under which the inventory item may be shared for use by users other than the owner. In response to receiving the owner request, metadata comprising the terms and conditions is generated. It is ascertained that the terms and conditions in the received metadata permit use of the shared inventory item by a particular user from whom a user request to use the shared inventory item had been received and in response, the shared inventory item for use of the shared inventory item by the particular user is rendered. The particular user is not the owner.

20 Claims, 7 Drawing Sheets

(51) Int. Cl.
  *G06Q 30/06*    (2012.01)
  *H04L 12/927*   (2013.01)
  *H04L 29/08*    (2006.01)

(52) U.S. Cl.
  CPC ............. *G06Q 30/06* (2013.01); *H04L 47/80* (2013.01); *H04L 67/10* (2013.01); *H04L 67/306* (2013.01)

(56) References Cited

U.S. PATENT DOCUMENTS

| | | | |
|---|---|---|---|
| 6,753,857 | B1 | 6/2004 | Matsuura et al. |
| 6,941,184 | B2 | 9/2005 | Ebert |
| 7,069,228 | B1 | 6/2006 | Rose et al. |
| 7,587,338 | B2 | 9/2009 | Owa |
| 7,666,095 | B2 | 2/2010 | Van Luchene |
| 7,713,116 | B2 | 5/2010 | Keam et al. |
| 8,018,462 | B2 | 9/2011 | Bhogal et al. |
| 8,145,676 | B2 | 3/2012 | Bhogal et al. |
| 9,256,898 | B2 | 2/2016 | Bhogal et al. |
| 2002/0002541 | A1 | 3/2002 | Williams |
| 2002/0029179 | A1 | 3/2002 | Gruber et al. |
| 2002/0052756 | A1 | 5/2002 | Lomangino |
| 2002/0059120 | A1* | 5/2002 | Milton ............... G06F 21/10 705/28 |
| 2002/0107701 | A1 | 8/2002 | Batty et al. |
| 2005/0021353 | A1 | 1/2005 | Aviles et al. |
| 2005/0261980 | A1 | 11/2005 | Hadi |
| 2007/0033279 | A1 | 2/2007 | Battat et al. |
| 2007/0052702 | A1 | 3/2007 | Trotta et al. |
| 2007/0075993 | A1 | 4/2007 | Nakanishi et al. |
| 2007/0118420 | A1 | 5/2007 | Jung et al. |
| 2008/0022137 | A1 | 1/2008 | Ginter et al. |
| 2008/0109910 | A1 | 5/2008 | Day et al. |
| 2008/0204448 | A1 | 8/2008 | Dawson et al. |
| 2008/0215984 | A1* | 9/2008 | Manico ............... G11B 27/031 715/730 |
| 2009/0158161 | A1 | 6/2009 | Gibbs et al. |
| 2009/0204514 | A1 | 8/2009 | Bhogal et al. |

OTHER PUBLICATIONS

Office Action (dated May 7, 2010) for U.S. Appl. No. 12/029,194.
Office Action (dated Jan. 7, 2011) for U.S. Appl. No. 12/029,132, filed Feb. 11, 2008; Confirmation No. 8207.
Office Action (dated May 10, 2011) for U.S. Appl. No. 12/032,464, filed Feb. 15, 2008; Confirmation No. 4425.
Notice of Allowance (dated May 11, 2011) for U.S. Appl. No. 12/029,132, filed Feb. 11, 2008; Confirmation No. 8207.
Blizzard Entertainment: World of Warcraft, "Guild Banks" (Internet Archived Content: Guild Banks found at www.worldofwarcraft.com/info/basics/guildbanks.html), Feb. 4, 2008, pp. 1-3.
Office Action (dated Aug. 18, 2010) for U.S. Appl. No. 12/032,488, filed Feb. 15, 2008; Confirmation No. 4465.
Final Office Action (dated May 17, 2011) for U.S. Appl. No. 12/032,488, filed Feb. 15, 2008; Confirmation No. 4465.
Notice of Allowance (dated Sep. 16, 2011) for U.S. Appl. No. 12/032,464, filed Feb. 15, 2008; Confirmation No. 4425.
Advisory Action (dated Aug. 16, 2011) for U.S. Appl. No. 12/032,488, filed Feb. 15, 2008; Confirmation No. 4465.
Notice of Appeal (Filed Sep. 16, 2011) for U.S. Appl. No. 12/032,488, filed Feb. 15, 2008; Confirmation No. 4465.
Notice of Allowance (dated Nov. 21, 2011) for U.S. Appl. No. 12/029,194, filed Feb. 11, 2008; Confirmation No. 8336.
Examiner's Answer (dated Mar. 14, 2012) for U.S. Appl. No. 12/028,918, filed Feb. 15, 2008; Confirmation No. 4465.
Reply Brief filed May 10, 2012 in response to Examiner's Answer (dated Mar. 14, 2012) for U.S. Appl. No. 12/028,918, filed Feb. 15, 2008; Confirmation No. 4465.
U.S. Appl. No. 14/552,526, filed Nov. 25, 2014.
Office Action (dated Aug. 10, 2009) for U.S. Appl. No. 12/028,918, filed Feb. 11, 2008, Conf. No. 7767.
Amendment (dated Nov. 3, 2009) for U.S. Appl. No. 12/028,918, filed Feb. 11, 2008, Conf. No. 7767.
Final Office Action (dated Nov. 29, 2009) for U.S. Appl. No. 12/028,918, filed Feb. 11, 2008, Conf. No. 7767.
RCE (dated Feb. 23, 2010) for U.S. Appl. No. 12/028,918, filed Feb. 11, 2008, Conf. No. 7767.
Office Action (dated Apr. 16, 2010) for U.S. Appl. No. 12/028,918, filed Feb. 11, 2008, Conf. No. 7767.
Amendment (dated Jul. 12, 2010) for U.S. Appl. No. 12/028,918, filed Feb. 11, 2008, Conf. No. 7767.
Final Office Action (dated Aug. 5, 2010) for U.S. Appl. No. 12/028,918, filed Feb. 11, 2008, Conf. No. 7767.
RCE (dated Nov. 5, 2010) for U.S. Appl. No. 12/028,918, filed Feb. 11, 2008, Conf. No. 7767.
Office Action (dated Jan. 30, 2012) for U.S. Appl. No. 12/028,918, filed Feb. 11, 2008, Conf. No. 7767.
Final Office Action (dated May 15, 2012) for U.S. Appl. No. 12/028,918, filed Feb. 11, 2008, Conf. No. 7767.
Final Amendment (dated Jul. 11, 2012) for U.S. Appl. No. 12/028,918, filed Feb. 11, 2008, Conf. No. 7767.
Amendment (dated Apr. 17, 2012) for U.S. Appl. No. 12/028,918, filed Feb. 11, 2008, Conf. No. 7767.
Advisory Action (dated Jul. 8, 2012) for U.S. Appl. No. 12/028,918, filed Feb. 11, 2008, Conf. No. 7767.
Notice of Appeal (dated Aug. 15, 2012) for U.S. Appl. No. 12/028,918, filed Feb. 11, 2008, Conf. No. 7767.
Appeal Brief (dated Oct. 9, 2012) for U.S. Appl. No. 12/028,918, filed Feb. 11, 2008, Conf. No. 7767.
Examiner's Answer (dated Dec. 17, 2012) for U.S. Appl. No. 12/028,918, filed Feb. 11, 2008, Conf. No. 7767.
Reply Brief (dated Feb. 13, 2013) for U.S. Appl. No. 12/028,918, filed Feb. 11, 2008, Conf. No. 7767.
Notice of Allowance (dated Oct. 8, 2015) for U.S. Appl. No. 12/028,918, filed Feb. 11, 2008, Conf. No. 7767.
Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <https://www.uspto.gov/about-us/news-updates/remarks-director-iancu-intellectual-property-owners-46th-annual-meeting>, 7 pages.

* cited by examiner

MANAGING SHARED INVENTORY IN A VIRTUAL UNIVERSE

This application is a continuation application claiming priority to Ser. No. 12/028,918, filed Feb. 11, 2008.

FIELD OF INVENTION

The present invention is in the field of data processing systems and, in particular, to systems, methods and media for managing shared inventory in a virtual universe.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the Internet or other broad-based network in order to communicate with other computer systems, access information or other resources, or perform various tasks associated with business, personal banking, electronic commerce transactions, or other endeavors.

One application for computer systems that is increasing in importance is for use in accessing virtual universes (VUs), which are also known as virtual worlds and virtual world environments (VWEs). A VU represents a real or imaginary place using graphics, images, video, auditory data, or other sensory data to define a representation on a computer system to one or more users. The hardware and software that together create a VU provide the ability for users to interact with the VU in various ways. VUs commonly allow for multiple users to simultaneously interact with the VU, allowing the users to thus interact with each other within the VU and form a community. Current VUs such as Second Life® by Linden Lab or There® by Makena Technologies provide an interactive, three-dimensional (3D) online digital world with hundreds of thousands of users accessing the world via the Internet. In these graphical VUs, users typically are represented by an avatar within the online world, and the users may command their avatar to move within the VU, communicate with other users via their avatars, etc., and thus interact with the virtual world. VUs typically allow users (using a client program on their computer system) to use various tools to view, navigate, and modify the virtual world as well as participate in its virtual economy.

VU users typically have an inventory of items that they own, and these inventory items may be bought, sold, traded, etc. during operation of the VU. Items in a typical inventory may include clothing, virtual pets, vehicles, electronic media (e.g., music files), or other possessions. Each inventory item may represent a piece of code or other data which may be rendered in some fashion to the user during a session in the VU. Clothing inventory, for example, may be rendered as clothing for the user's avatar while a virtual dog, in another example, may render as an automated avatar that follows the user's avatar within the VU. The contents of a user's inventory are typically displayed in a hierarchical manner similar to an operating system's display of folders, subfolders, and files within a filesystem.

The current use of inventories within a VU is limited, individuals must typically manage their own inventories, manually adding or deleting inventory items from their inventory. Also, since each inventory item often has software code necessary to render it, the stored code results in significant storage and maintenance requirements within the VU as each instance of code is stored separately. The cost of purchasing or otherwise acquiring many inventory items is also sometimes prohibitive for many users. Another problem with current inventory systems is that sharing of inventory items is not available. A user wishing to loan an inventory item to another, for example, loses control of that item, making such a loan undesirable in many cases. For items such as artwork, the owner may want to retain some control over the item. For other items where control is not as important, a copy of an item can sometimes be made in order to facilitate exchange of items but this may result in excessive use of VU resources. The lack of sharing may thus exacerbate the storage problems associated with inventory items as the code must be stored for each individual user. Managing inventories has thus become a major problem in VU space as such inventories are increasingly taken up by functional software, documents, and other such items that today reside on local drives.

SUMMARY OF THE INVENTION

The problems identified above are in large part addressed by systems, methods and media for managing shared inventory in a virtual universe. A method for managing shared inventory in a virtual universe is disclosed. Embodiments of the method may include receiving notification of a user session being established between a user and a virtual universe simulator. The method may also include accessing a list of shared inventory items for the user where the list of shared inventory items includes one or more shared inventory items each having an inventory source associated with it. Embodiments may also include retrieving at least one shared inventory item from its associated inventory source and passing the retrieved at least one shared inventory item to the virtual universe simulator. Further embodiments may include retrieving an updated listing for the shared inventory items from their associated inventory sources and passing the updated shared inventory item list to the virtual universe simulator. Further embodiments may include passing metadata for shared inventory items to the virtual universe simulator.

Another embodiment provides a computer program product comprising a computer-useable medium having a computer readable program wherein the computer readable program, when executed on a computer, causes the computer to perform a series of operations for managing shared inventory in a virtual universe. The series of operations generally includes receiving notification of a user session being established between a user and a virtual universe simulator. The series of operations may also include accessing a list of shared inventory items for the user where the list of shared inventory items includes one or more shared inventory items each having an inventory source associated with it. Embodiments may also include retrieving at least one shared inventory item from its associated inventory source and passing the retrieved at least one shared inventory item to the virtual universe simulator. Further embodiments may include retrieving an updated listing for the shared inventory items from their associated inventory sources and passing the updated shared inventory item list to the virtual universe simulator. Further embodiments may include passing metadata for shared inventory items to the virtual universe simulator.

A further embodiment provides a data processing system having a machine-accessible medium storing a plurality of program modules. Embodiments may include a virtual universe simulator interface module to facilitate communication to and from a virtual universe simulator and to receive notification of a user session to the virtual universe simulator being established. Embodiments may also include a shared inventory enabler module to manage shared inventory items in a virtual universe. The shared inventory enabler module may include an inventory list module to access a list of shared inventory items for the user that includes one or more shared inventory items each having an inventory source associated with it. The shared inventory enabler module may also include an inventory software module to retrieve at least one shared inventory item from its associated inventory source for passing to the virtual universe simulator.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

Figure 1:
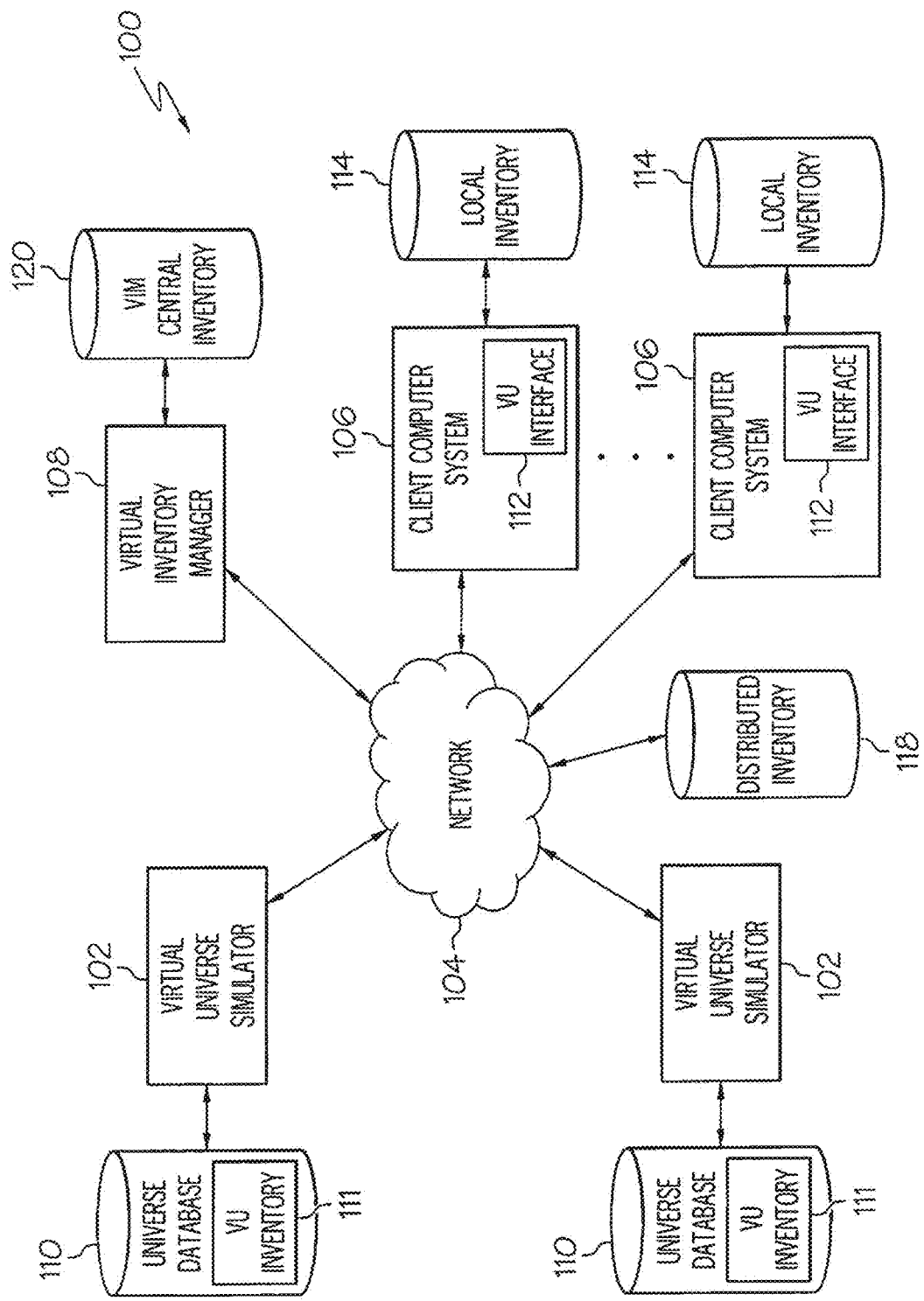
FIG. 1 depicts a virtual universe inventory system with one or more virtual universe simulators, one or more client computer systems, a virtual inventory manager and various inventory sources according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for managing shared inventory in a virtual universe are disclosed. Embodiments of the method may include receiving notification of a user session being established between a user and a virtual universe simulator. The method may also include accessing a list of shared inventory items for the user where the list of shared inventory items includes one or more shared inventory items each having an inventory source associated with it. Embodiments may also include retrieving at least one shared inventory item from its associated inventory source and passing the retrieved at least one shared inventory item to the virtual universe simulator. Further embodiments may include retrieving an updated listing for the shared inventory items from their associated inventory sources and passing the updated shared inventory item list to the virtual universe simulator. Further embodiments may include passing metadata for shared inventory items to the virtual universe simulator.

The system and methodology of the depicted embodiments allow for effective and efficient management of shared inventory in a virtual universe. By allowing users to share inventory items, users can retain some level of control over their property by placing restrictions on the use of the item by others according to some embodiments. The resources required to store and maintain various inventory items may also be reduced as the disclosed shared inventory system prevents wasteful duplicative storage of shared inventory items. A user may have in their inventory list a number of shared inventory items that are stored at a variety of locations, many remote. In this fashion, the shared inventory items need not be stored in a unique instance for each user sharing the item and can instead be efficiently stored in one location. A user who is offering an item for sharing may restrict sharing by others in a variety of ways, such as by putting time limits on others' usage, requiring for the others to first pay a fee, limiting how the other users may utilize the item, or other restrictions.

In general, the routines executed to implement the embodiments of the invention may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes hut is not limited to firmware, resident software, microcode, etc. Moreover, embodiments of the invention may also be implemented via parallel processing using a parallel computing architecture, such as one using multiple discrete systems (e.g., plurality of computers, etc.) or an internal multiprocessing architecture (e.g., a single system with parallel processing capabilities).

Aspects of embodiments of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts a virtual universe (VU) inventory system 100 with one or more virtual universe simulators 102, one or more client computer systems 106, a virtual inventory manager 108 and various inventory sources according to some embodiments. In the depicted embodiment, the virtual universe inventory system 100 includes one or more virtual universe simulators 102 in communication with a plurality of client computer systems 106 via network 104. The virtual universe simulator 102 and client computer systems 106 may also be in communication with a virtual inventory manager 108 via network 104. A variety of possible inventory sources are also depicted, including VU inventory databases 111 for each virtual universe simulator 102, local inventory databases 114 for each client computer system 106, distributed inventory 118, and a virtual inventory manger (VIM) central inventory 120. As will be described in more detail subsequently, a virtual universe simulator 102 may manage a virtual universe (VU) by interacting with a variety of users of client computer systems 106 and the virtual inventory manager 108 may facilitate sharing of inventory items between various users of the client computer systems 106. While a plurality of virtual universe simulators 102 and client computer systems 106 are depicted, one of ordinary skill in the art will recognize that the virtual inventory manager 108 may facilitate shared inventory items with either a single virtual universe simulator 102 or multiple simulators.

Inventory items may be any item that may be associated with a user in a virtual universe. Inventory items may each be comprised of one or more files, be part of a larger database, or be stored in any other fashion. In some embodiments, an inventory item may be a piece of software code that is renderable in a virtual universe. In other embodiments, inventory items may be represented as non-executable data that may be used by the VU to render the inventory item for the user when needed. Non-limiting examples of inventory items include graphics files, sound files, animations, electronic documents, video files, avatar clothing or accessories, avatar body parts, avatar tools or vehicles or other objects, avatar gestures, automated avatars, calling cards, landmarks (such as bookmarked locations) or other geographical information, items in a lost and found folder, note cards, photos and photo albums, scripts (e.g., macros to perform actions), textures, deleted items, or any other type of item. One of ordinary skill in the art will recognize that inventory items may include executable code, non-executable data, or any other type of information, and may also represent any type of item within a VU.

Virtual universe simulator 102 may be implemented on one or more servers or other computer systems (such as those described in relation to FIG. 2) adapted to implement all or part of a virtual universe. The virtual universe simulator 102 may be implemented, for example, on one or more application servers such as International Business Machine's (IBM®'s) WebSphere® Application Server (WAS) that may serve as middleware to set up, operate, and integrate e-business applications across multiple computing platforms using Web technologies. The virtual universe simulator 102 may provide a virtual universe to users by accessing stored information from a database and creating and operating a virtual universe based on the stored information. To accomplish this, the virtual universe simulator 102 may render the virtual universe, including a user's inventory items, on the client computer system 102 so that the user can view or otherwise experience the virtual universe. An example virtual universe simulator 102 may include massively multiplayer online games such as the Second Life® virtual world from Linden Lab or There® by Makena Technologies.

A virtual universe simulator 102 may also have a universe database 110 to store a variety of tiles used to create, maintain, and operate a virtual universe (collectively "environment information"), such as graphics files (e.g., buildings, avatars, landscapes, items, etc.), sound files (e.g., environmental sounds, spoken words, etc.), or text files (e.g., configuration information, descriptive information for objects, user information, etc.). The universe database 110 may include a VU inventory database 111 storing shared inventory items and/or information relating to shared inventory items, such as item metadata. Shared inventory items, much like traditional inventory items, may be rendered within a virtual universe. The VU inventory database 111 may be wholly or partially a separate database from the universe database 110 or it may be integrated within the universe database 110 as depicted. The universe database 110 and VU inventory database 111 may each be stored on any type or combination of storage devices, including volatile or non-volatile storage such as hard drives, storage area networks, memory, fixed or removable storage, or other storage devices.

Users may utilize a client computer system 106 according to the present embodiments to access the virtual universe simulator 102 (and thus the virtual universe) via network 104. Client computer system 106 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. A user of the client computer system 106 may utilize a VU interface 112 to interact with the VU operated by the virtual world simulator 102. VU interface 112 may be dedicated client software provided by the VU operator in some embodiments or it may alternatively be existing general software such as a browser.

The client computer system 106 may optionally have a local inventory database 114 to store shared inventory items and/or information relating to shared inventory items, such as item metadata. The local inventory database 114 may be stored on any type or combination of storage devices, including volatile or non-volatile storage such as hard drives, storage area networks, memory, fixed or removable storage, or other storage devices. A local inventory database 114 may be useful when a user stores some of their inventory items locally, including items that they may make available for sharing. In some embodiments, a local inventory database 114 is not needed and inventory items are stored in other inventory sources such as the VU inventory database 111.

Network 104 may be any type of data communications channel or combination of channels, such as the Internet, an intranet, a LAN, a WAN, an Ethernet network, a wireless network, telephone network, a proprietary network, or a broadband cable network. In one example, the Internet may serve as network 104 and the client computer systems 106, the virtual inventory manager 108, and the virtual universe simulator 102 may communicate via the Internet using known protocols. Those skilled in the art will recognize, however, that the invention described herein may be implemented utilizing any type or combination of data communications channel(s) without departure from the scope and spirit of the invention.

The virtual inventory manager 108, as will be described in more detail in relation to FIG. 3, may manage shared inventory items for one or more virtual universe simulators 102 (and thus one or more virtual universes). In some embodiments, the virtual inventory manager 108 may facilitate the copying of a shared inventory item from an inventory source to the virtual universe simulator 102 when the shared inventory item is requested. By facilitating such copying, the virtual inventory manager 108 allows the virtual universe simulator 102 to avoid having to store a copy of a shared inventory item for each instance of a user having rights to the item. In an example, a user may have multiple items in her inventory, some of which are shared inventory items. The shared inventory items may be represented as pointers or references to the shared inventory item that is stored at a remote inventory source as part of a shared managed inventory. When the user checks her inventory (or at an earlier time), the virtual inventory manager 108 may in effect access the remote shared inventory item and provide that shared inventory item to the virtual universe simulator 102, which may in turn render the inventory item to the user.

From the point of the view of the user, it will appear in this example as if the item had been in her inventory all along. The virtual inventory manager 108 may also optionally cache some or all shared inventory items and query inventory sources periodically for new or updated items in order to improve its efficiency.

The virtual inventory manger 108 may optionally include a VIM central inventory database 120 to store shared inventory items related information. The VIM central inventory database 120 may be stored on any type or combination of storage devices, including volatile or non-volatile storage such as hard drives, storage area networks, memory, fixed or removable storage, or other storage devices. In some embodiments, shared items may be stored on the VIM central inventory database 120 instead of a VU inventory database 111 associated with a virtual universe simulator 102 or a local inventory database 114 of a user. The VIM central inventory database 120 may be particularly useful for situations where a virtual universe operator does not want to manage shared resources or for when inventory items may be shared across multiple virtual universes. A user may, for example, wish to use and share inventory items in multiple virtual universes to which they belong and a centralized database to store such items may provide efficiency benefits.

A virtual inventory manager 108 may be operated by a virtual universe simulation owner, a third party provider, or other entity. The virtual inventory manager 108 may also have a VIM Application Programming Interface (API) to facilitate access to and from any virtual universe simulator 102, which may be particularly useful for third party-managed virtual inventory managers 108. Once a VIM API is established, a virtual universe simulator 102 that wishes to take advantage of the services of a virtual inventory manager 108 can ensure compatibility and operability via use of the VMI API.

A distributed inventory database 118 is another option for an inventory source to store shared inventory items and related information. A distributed inventory database 118 may be a separate database from any of the other components of the virtual universe inventory system 100. A distributed inventory database 118 may be particularly useful for content providers, such as music or video distributors, that wish to maintain control of their content and potentially service multiple virtual universe simulators 102. The distributed inventory database 118 may be stored on any type or combination of storage devices, including volatile or non-volatile storage such as hard drives, storage area networks, memory, fixed or removable storage, or other storage devices.

According to some embodiments, the virtual inventory manager 108 may be considered an abstraction layer between traditional means of connecting data among servers and a virtual universe simulator-specific graphical user interface (GUI). The means of connecting data among servers may include network file system (NTS) applications, structured query language (SQL), file transfer protocol (ftp), a services-oriented architecture (SOA) request, or other methodologies. A particular shared inventory item may be stored at any inventory source within the virtual universe inventory system 100, including on VU inventory databases 111, local inventory databases 114, distributed inventory databases 118, or VIM central inventory databases 120. While many types of inventory sources are depicted, one of ordinary skill in the art will recognize that not all depicted inventory sources are required and that only one inventory source would be sufficient according to the present embodiments. As described previously, the virtual inventory manager 108 may access a particular shared inventory item from its original location and provide it to a virtual universe simulator 102 so that a user with the appropriate permissions can access the shared inventory item regardless of its original location.

Various non-limiting examples may serve to further illustrate the disclosed virtual universe inventory system 100. In one example, a user of a client computer system may wish to share an inventory item stored in their local inventory database 114 with other users of their virtual universe. By designating the inventory item as shareable, other users will be able to enjoy the inventory item during their own user sessions in the virtual universe as the virtual inventory manager 108 will facilitate copying the original inventory item as needed so that the item renders for the other users. The owning user may also limit the sharing in a variety of fashions, such as by using metadata to specify the terms and conditions of sharing. By retaining the only 'permanent' version of the item, according to some embodiments, the owning user may have improved control over its use compared to current systems. In other example, a content provider may maintain a distributed inventory database 118 including multiple shareable inventory items. The content provider may potentially provide access to these items to many users across multiple virtual universe simulators 102 without having to distribute persistent copies of their content, providing possible advantages in protection of intellectual property.

Figure 2:
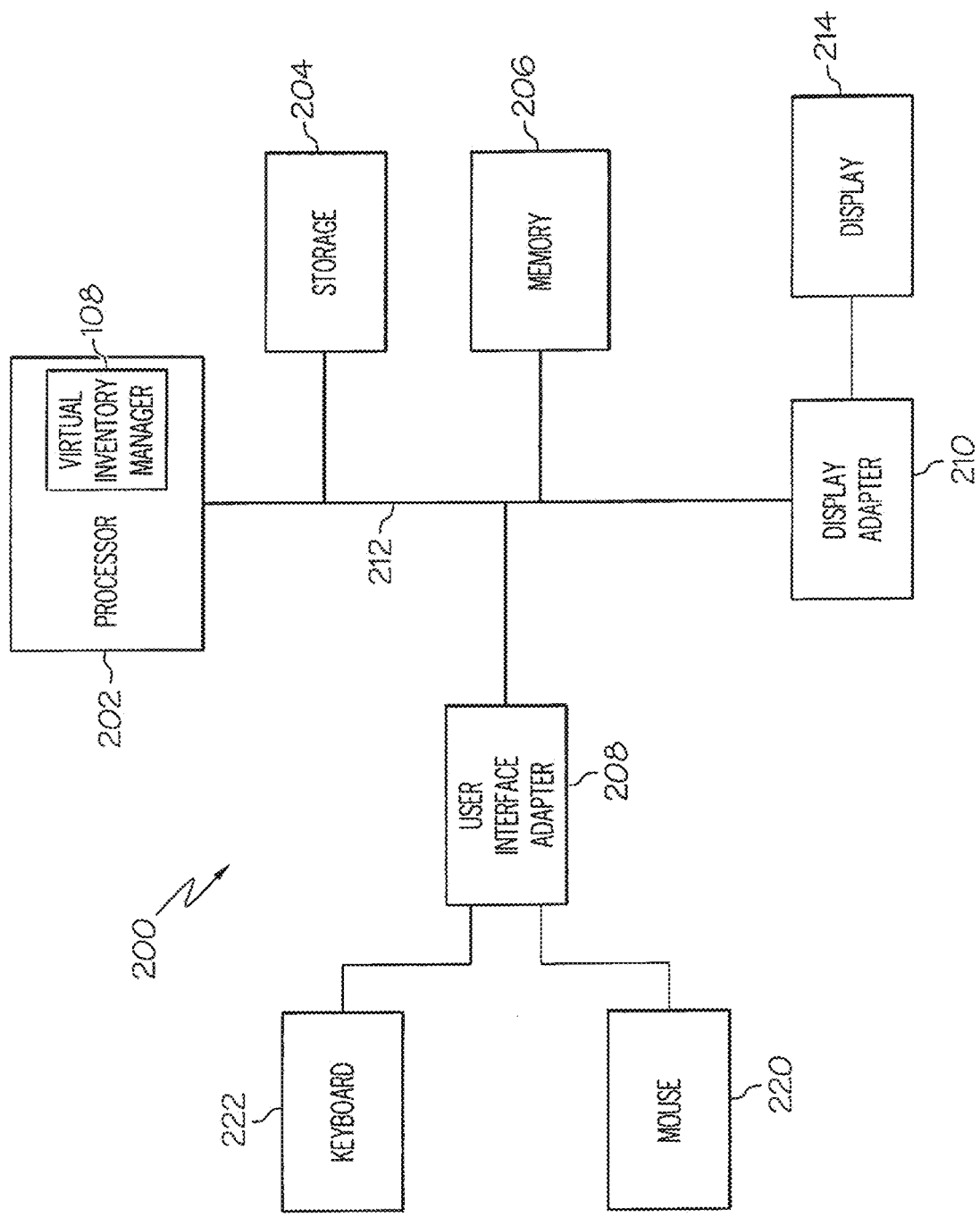
FIG. 2 depicts a block diagram of one embodiment of a computer system suitable for use as a component of the virtual universe inventory system, such as a client computer system or a data processing system to execute the virtual inventory manager.

FIG. 2 depicts a block diagram of one embodiment of a computer system 200 suitable for use as a component of the virtual universe inventory system 100, such as a client computer system 106 or a data processing system to execute the virtual inventory manager 108. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the virtual inventory manager 108, such as by accessing and passing shared inventory items to a virtual world simulator 102, and may temporarily or permanently store information during its calculations or results after calculations in storage 204 or memory 206. All or part of the virtual inventory manager 108, for example, may be stored in memory 206 during execution of its routines. Similarly, processor 202 may execute instructions for the VU interface 112 when computer system 200 is used for a client computer system 106.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a client computer system 106 attempting access to a shared inventory item, for example, may utilize the keyboard 222 and mouse 220 to interact with their computer system. The bus 212 may also connect the processor 202 to a display 214, such as an LCD display or CRT monitor, via the display adapter 210.

Figure 3:
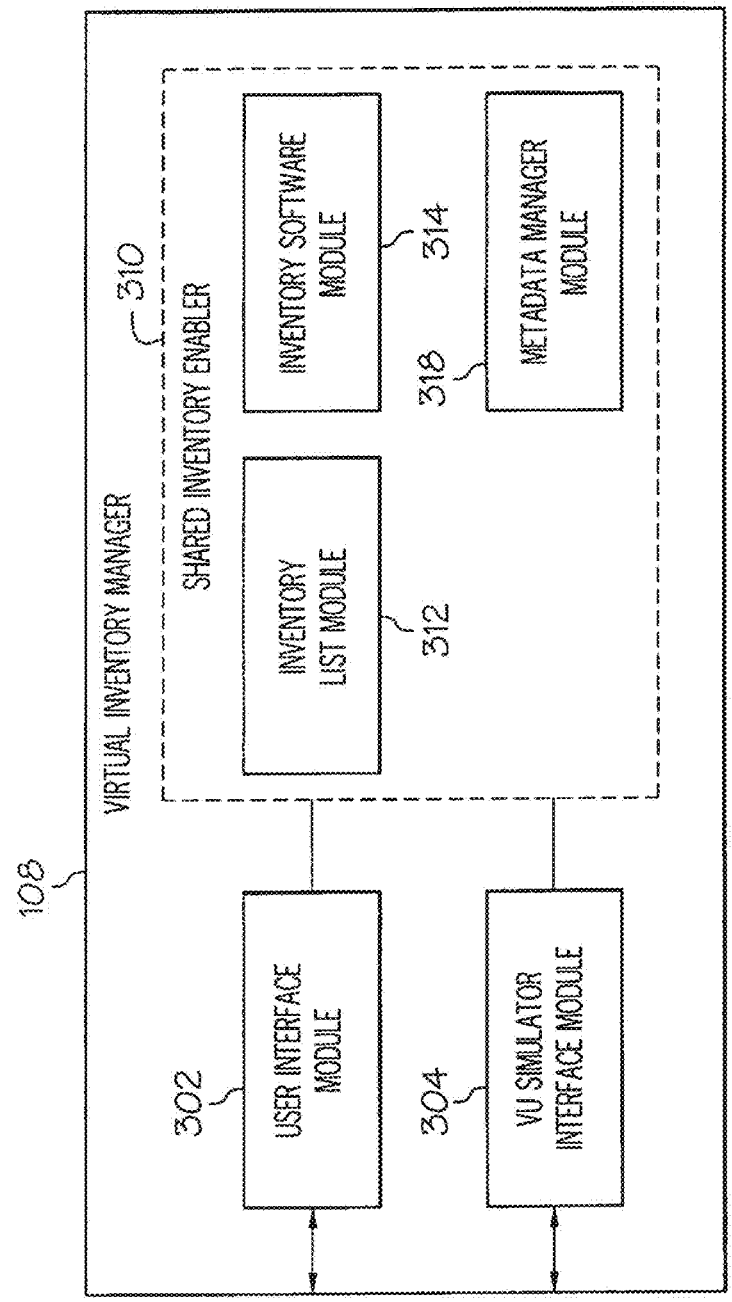
FIG. 3 depicts a conceptual illustration of software components of a virtual inventory manager according to some embodiments.

FIG. 3 depicts a conceptual illustration of software components of a virtual inventory manager 108 according to some embodiments. The virtual inventory manager 108 may be implemented on a computer system 200 such as described in relation to FIG. 2, including on one or more servers. The virtual inventory manager 108 may also alternatively be implemented as part of a virtual universe simulator 102 (i.e., executing on the same servers). As described previously and also in relation to FIG. 5, the virtual inventory manager 108 may manage shared inventory items for one or more virtual universe simulators 102 (and thus one or more virtual universes). The virtual inventory manager 108 may include components to assist it with its functions, including a user interface module 302, a VU simulator interface module 304, and a shared inventory enabler 310. The shared inventory enabler 310 may include its own components, such as an inventory list module 312, an inventory software module 314, and a metadata manager module 318. One of ordinary skill in the art will recognize that the functionality of each component of the virtual inventory manager 108 may be combined or divided in any fashion and the description herein is merely intended to be illustrative of some embodiments.

The user interface module 302 may facilitate communication to and from a user, including transmitting and receiving information associated with configuring an inventory item for sharing. For example, a user may request (and the user interface module 302 may receive) parameters for the sharing of a particular item, such as by limiting the other users who can access it, the length of time they may use it, or other limitation. The VU simulator interface module 304 may facilitate communication to and from virtual universe simulators 102, such as by receiving notification of user sessions being established and requests for stored shared inventory items and by transmitting shared inventory items or metadata to a virtual universe simulator 102.

The shared inventory enabler 310, and its components, may communicate with the two interface modules to assist it in performing its task of managing shared inventory items in a virtual universe (or multiple virtual universes). The inventory list module 312 may access a list of shared inventory items for the user upon receiving notification that the user has established a session with a virtual universe simulator 102. The shared inventory item list may include one or more shared inventory items each having an inventory source (i.e., where the shared inventory item is located) associated with it. The inventory list module 312 may also retrieve updated listings for shared inventory items from their associated inventory sources and may also pass the updated shared inventory item list to the virtual universe simulator 102. The inventory list module 312 may optionally establish or verify a connection with the various inventory sources as part of its task.

The inventory software module 314 may retrieve shared inventory items from its associated inventory source for passing to the virtual universe simulator 102. The inventory software module 314 may access records of the location of particular shared inventory items in order to accomplish this task. To accomplish this, the inventory software module 314 may access a list of shared inventory items for the user that includes an inventory source for the items (such as the list updated by the inventory list module 312). Using the shared inventory item list, the inventory software module 314 may retrieve the shared inventory items from their associated inventory source and may then pass the retrieved items to the virtual universe simulator 102 (via the VU simulator interface module 304).

The metadata manager module 318 may pass metadata for shared inventory items to the virtual universe simulator 102 to assist in controlling or limiting access to the shared inventory items. The metadata may include information relating to sharing of shared inventory items with users other than their owner. Metadata may be associated with a particular inventory item using any type of methodology. Metadata, may, for example, mark an item for sharing by all, may mark the item for sharing with particular users, mark the item for sharing for particular users, etc. In other examples, metadata may mark an item for auction, barter, or other means of sharing items. In yet another example, metadata may mark an inventory item by a rating, such as a compilation of user ratings for the item. This example may be useful in facilitating a user searching for inventory items that meet a desired standard of quality or popularity (e.g., a user may request all "five star" or "10 out of 10" rated items). The metadata may be persisted to a database (such as the inventory source of the item or a separate metadata database) and may also be used for visual indication of whether an object is available for sharing.

The use of metadata may allow a virtual inventory manager 108 (through the metadata manager module 318) to offer a variety of services. One service may provide for scheduling policies where the metadata includes an indication of a sharing scheduling policy that provides for use of a particular shared inventory item by different users at different times. An inventory owner may thus state that her items may be shared for predefined blocks of time (e.g., shared when owner not logged on, shared every evening between 6 and 10 p.m., etc.). Another service may provide for access control lists (ACLs) that allow owners to set up ACLs around which other members of the virtual universe may access the sharing status of a particular inventory item. A user may configure an ACL to, for example, specify that a particular other user to know that item A from their inventory is shareable but not to know that item B is similarly shareable with other users. Another inventory service the metadata manager module 318 may implement would include management of expiration of borrowing terms, such as by specifying a borrow time for an item. When the borrow time expires, a pop-up window or other notification could be used and renewal options could optionally be provided. One of ordinary skill in the art will recognize that metadata may be used to control or limit virtually every aspect of shared inventory items in a virtual universe.

Figure 4:
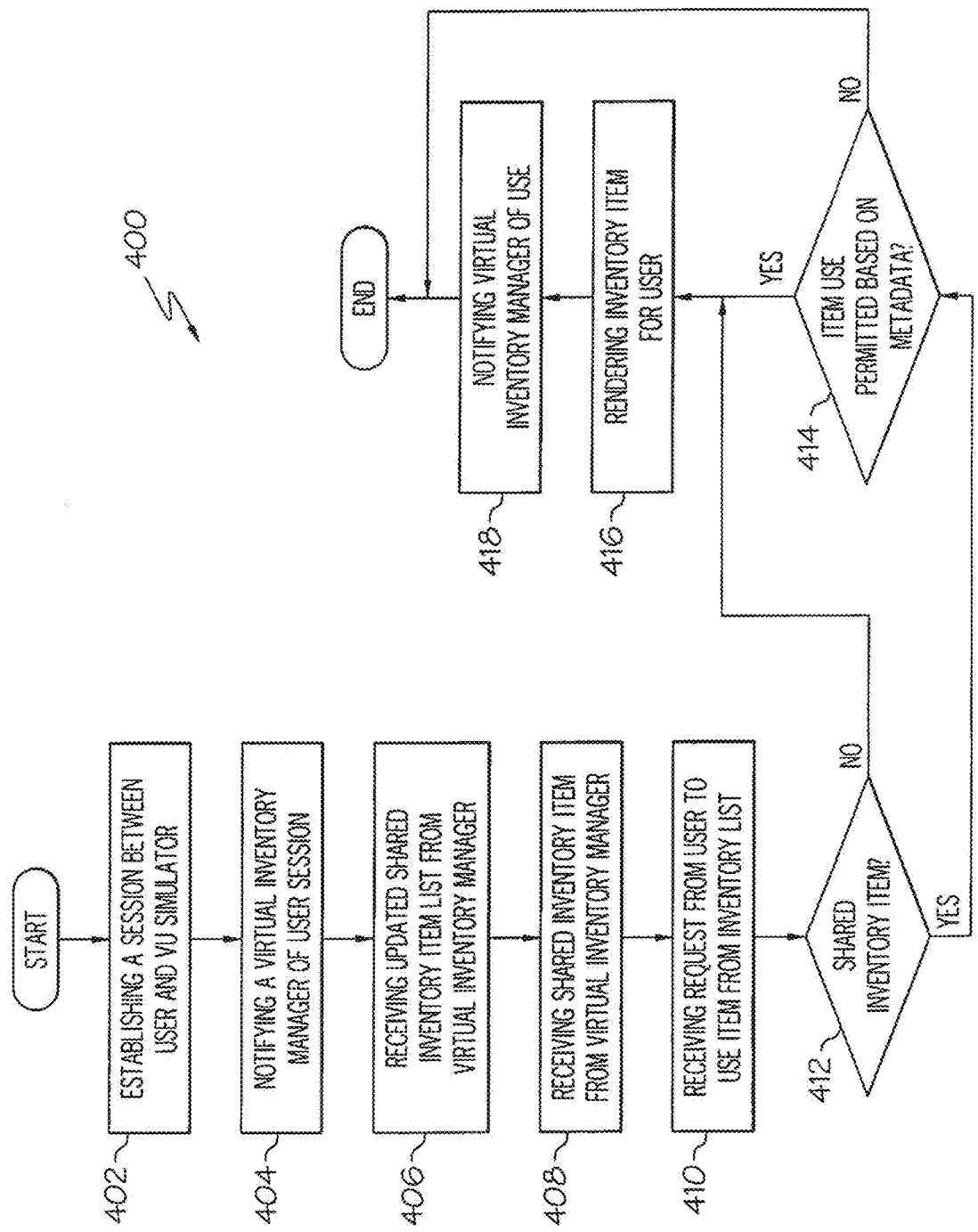
FIG. 4 depicts an example of a flow chart for rendering a shared inventory in a virtual universe according to some embodiments.

FIG. 4 depicts an example of a flow chart 400 for rendering a shared inventory item in a virtual universe according to some embodiments. The method of flow chart 400 may be performed, in one embodiment, by the virtual universe simulator 102. Flow chart 400 begins with element 402, establishing a session between a user and the virtual universe simulator 102. In some embodiments, establishing a user session will involve the user providing authentication information (such as a password and user id) and the virtual universe simulator 102 authenticating the user and establishing the session. The virtual universe simulator 102 may then at element 404 notify a virtual inventory manager 108 of the newly established user session so that the virtual inventory manager 108 may perform its tasks.

The virtual universe simulator 102 may receive an updated shared inventory item list from the virtual inventory manager 108 at element 406 and may similarly receive a shared inventory item (and any metadata) from the virtual inventory manager 108 at element 408. In some embodiments, the updated shared inventory items list is received first and the shared inventory item follows at a later time. For example, according to some embodiments, the item and metadata are not sent unless the user attempts to use the inventory item. In this example, the virtual universe simulator 102 would notify the virtual inventory manager 108 of the need to send the shared inventory item. In another example, all shared inventory items from the list are sent soon after the updated list. Alternatively, only the shared inventory items that are likely to be used (such as based on past history) are sent immediately and others are held back until needed. In yet another example, the virtual inventory manager 108 may send the shared inventory items and metadata for a first layer of subfolders in the inventory item hierarchy and the shared inventory items and metadata (and possibly listing) for lower tiers of subfolders in the hierarchy and are only sent if the user expands the folders below the first layer. One of ordinary skill in the art will recognize that the virtual universe simulator 102 and virtual inventory manager 108 may utilize any other known or later developed methodology for sending and displaying data from a remote source and apply these methodologies to the use of shared inventories.

During the user's session, the virtual universe simulator 102 may at element 410 receive a request from the user to use or otherwise access an item from their inventory list. At decision block 412, the virtual universe simulator 102 may determine if the inventory item to be used is a shared inventory item if the item is not a shared inventory item, the virtual universe simulator 102 may proceed to element 416 and render the inventory item for the user. If the item is a shared inventory item, the virtual universe simulator 102 may at decision block 414 determine if the item use is permitted based on any metadata associated with the item. If item use is not permitted, the method may terminate and may optionally notify the user that use was denied and provide the reasons for the denial. If item use is permitted, the virtual universe simulator 102 may at element 416 render the shared inventory item for the user using the shared inventory item received at element 408. After rendering the inventory item and if the item is a shared virtual inventory item, the virtual universe simulator 102 may optionally notify the virtual inventory manager 108 of the use of the shared inventory item, after which the method terminates.

Figure 5:
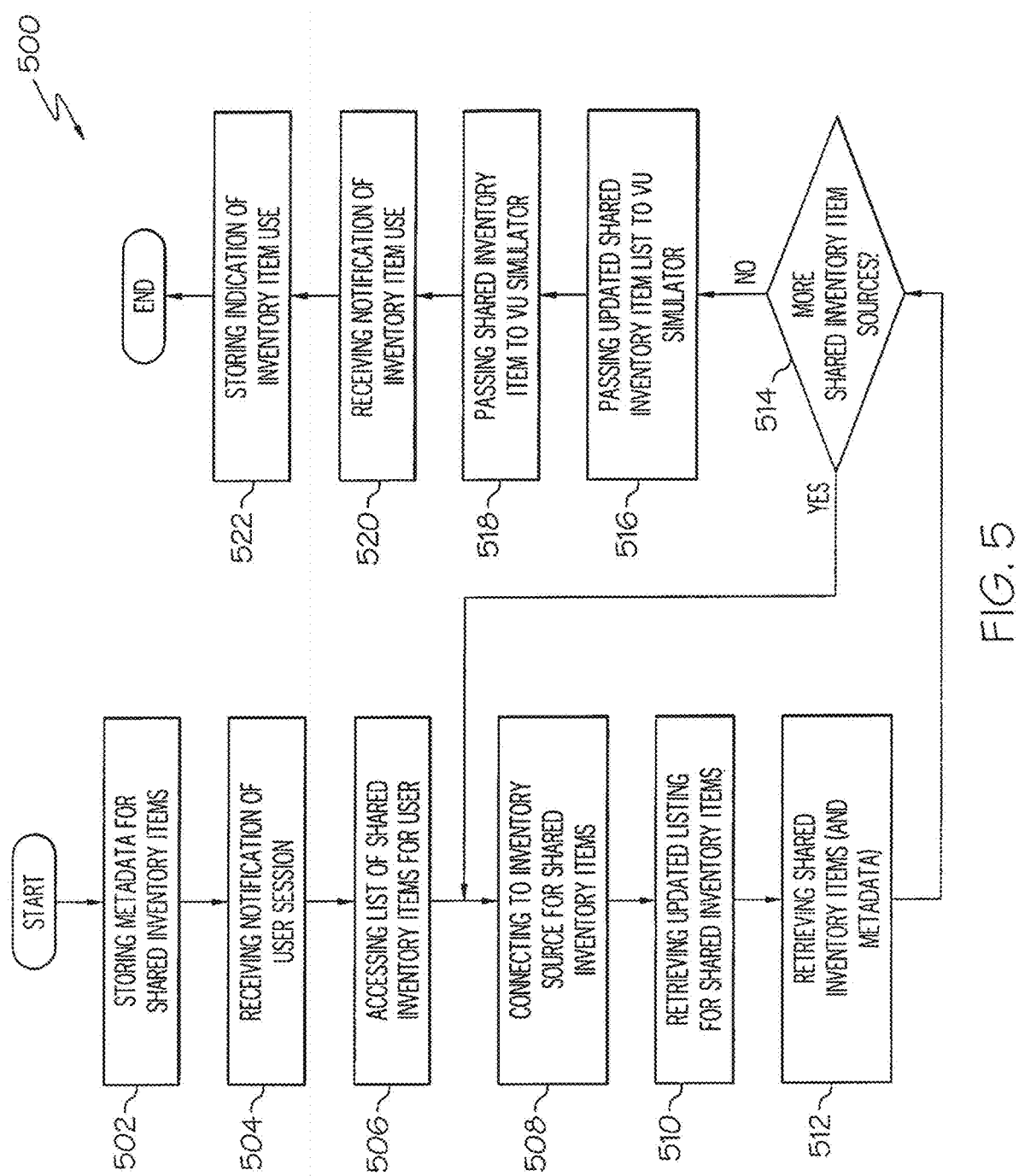
FIG. 5 depicts an example of a flow chart for managing a shared inventory item in a virtual universe according to some embodiments.

FIG. 5 depicts an example of a flow chart 500 for managing a shared inventory item in a virtual universe according to some embodiments. The method of flow chart 500 may be performed, in one embodiment, by the virtual inventory manager 108 and its components and sub-components. Flow chart 500 begins with element 502, storing any metadata for shared inventory items. The virtual inventory manager 108 may receive information from a user regarding inventory items they own at any time and may save metadata with the inventory item after receiving such information. As described previously, metadata may be stored with an inventory item at its inventory source, may be stored at a central location, or other location.

At element 504, the virtual inventory manager 108 may receive notification of a user session from a virtual universe simulator 102. The notification may include an identification of the user. Upon receiving the notification, the virtual inventory manager 108 may at element 506 access a list of shared inventory items for the user and their associated inventory sources. The virtual inventory manager 108 may then update information and retrieve each item on the list of shared inventory items. At element 508, the virtual inventory manager 108 may connect to the first inventory source for shared inventory items (or alternatively ensure that a previous connection is still active). The virtual inventory manager 108 may then at element 510 retrieve updated listings for the shared inventory items stored on that particular inventory source and may also at element 512 retrieve the shared inventory items themselves and metadata for the shared inventory items. If there are more shared inventory items with different sources at decision block 514, the method returns to element 508 to repeat the process. In this fashion, all listings of inventory items may be updated for the user and any shared inventory items and metadata may also be retrieved.

The virtual inventory manager 108 may next at element 516 pass the updated shared inventory item list to the virtual universe simulator 102 and may also at element 518 pass the shared inventory item(s) to the virtual universe simulator 102. As described previously in relation to FIG. 4, the virtual inventory manager 108 may perform these tasks at different times and under different conditions, such as by delaying passing the shared inventory items until they are needed.

The virtual inventory manager 108 may at optional element 520 receive a notification of inventory item use by a user and, at element 522, may store an indication of such if required, after which the method terminates. Item use may be relevant in cases, for example, where the metadata for an inventory item provides that only a limited number of users can share at once, where the owner wants to know who shares the item, or in other situations.

Figure 6:
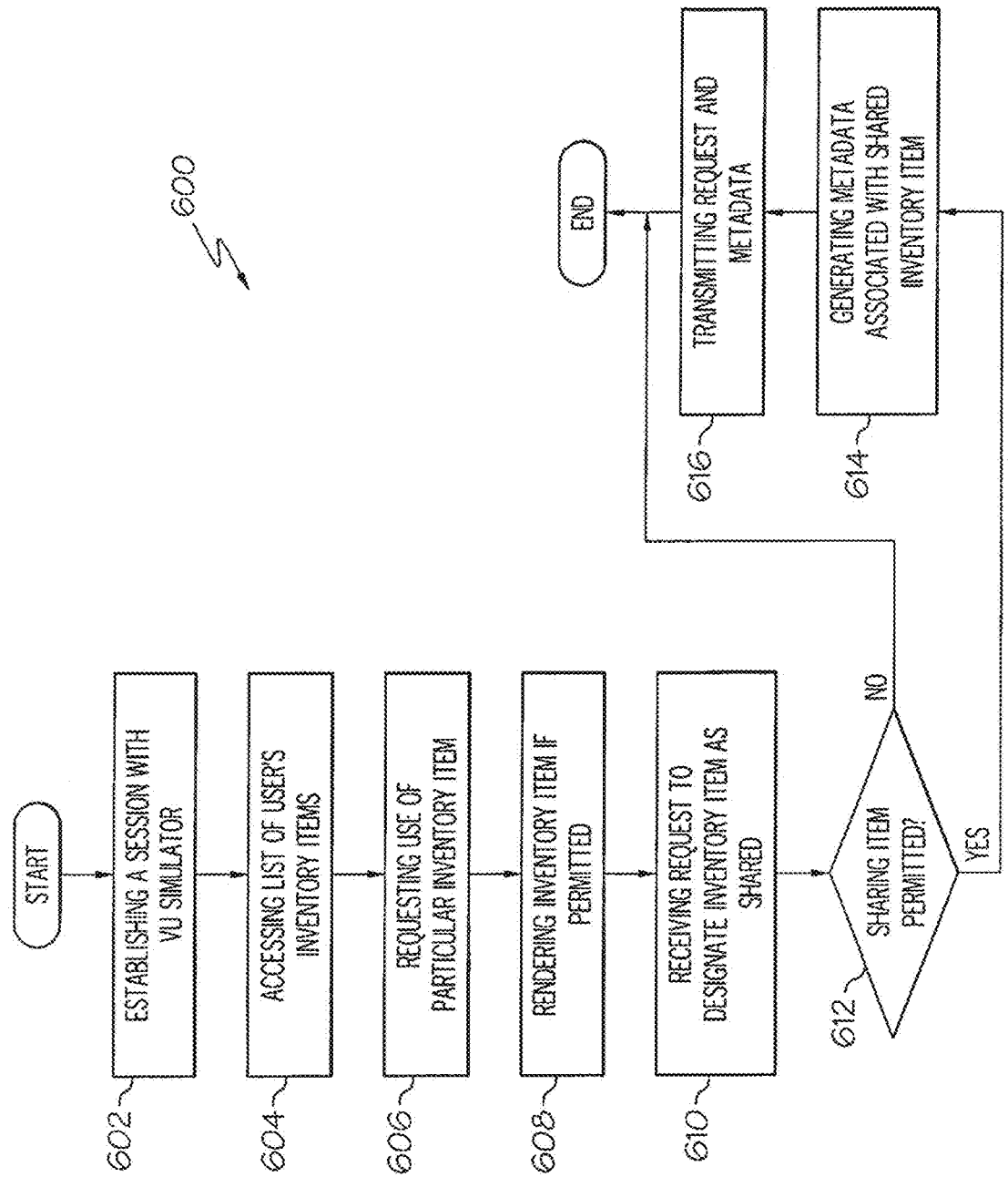
FIG. 6 depicts an example of a flow chart for using and configuring shared inventory items in a virtual universe according to some embodiments.

FIG. 6 depicts an example of a flow chart 600 for using and configuring shared inventory items in a virtual universe according to some embodiments. The method of flow chart 600 may be performed, in one embodiment, by a user utilizing a VU interface 112 of a client computer system 106. Flow chart 600 begins with element 602, establishing a session with a virtual universe simulator 102, such as by providing valid authentication credentials.

Once the user is 'logged in' to the virtual universe, they may proceed in the virtual universe until accessing a list of the user's inventory items at element 604. The list of inventory items for the user may include both shared inventory items (i.e., owned by others) as well as inventory items owned by the user. The shared inventory items may optionally be indicated as shared by some means, such as an asterisk next to their name in the list or other visual indication. The user may at element 606 request the user of a particular inventory item and, at element 608, the virtual universe simulator 102 will render at the client computer system 106 the inventory item if permitted, as described previously. From the point of the view of the user, using a permitted shared inventory item should be the same experience as using their own items according to some embodiments, providing a seamless use of shared inventory items by the user.

The VU interface 112 may receive from a user at element 610 a request to designate an inventory item that they own as a shared inventory item. The request may optionally include limitations to be implemented in metadata. If sharing of the item is permitted at decision block 612 (i.e., the user owns the item and it can be shared by its nature or virtual universe rules), the VU interface 112 may optionally generate metadata associated with the shared inventory item based on the user's request, default settings, or other information. The VU interface 112 may then transmit the request (and optional metadata) to the virtual universe simulator 102 or virtual inventory manager 108 for processing.

Figure 7:
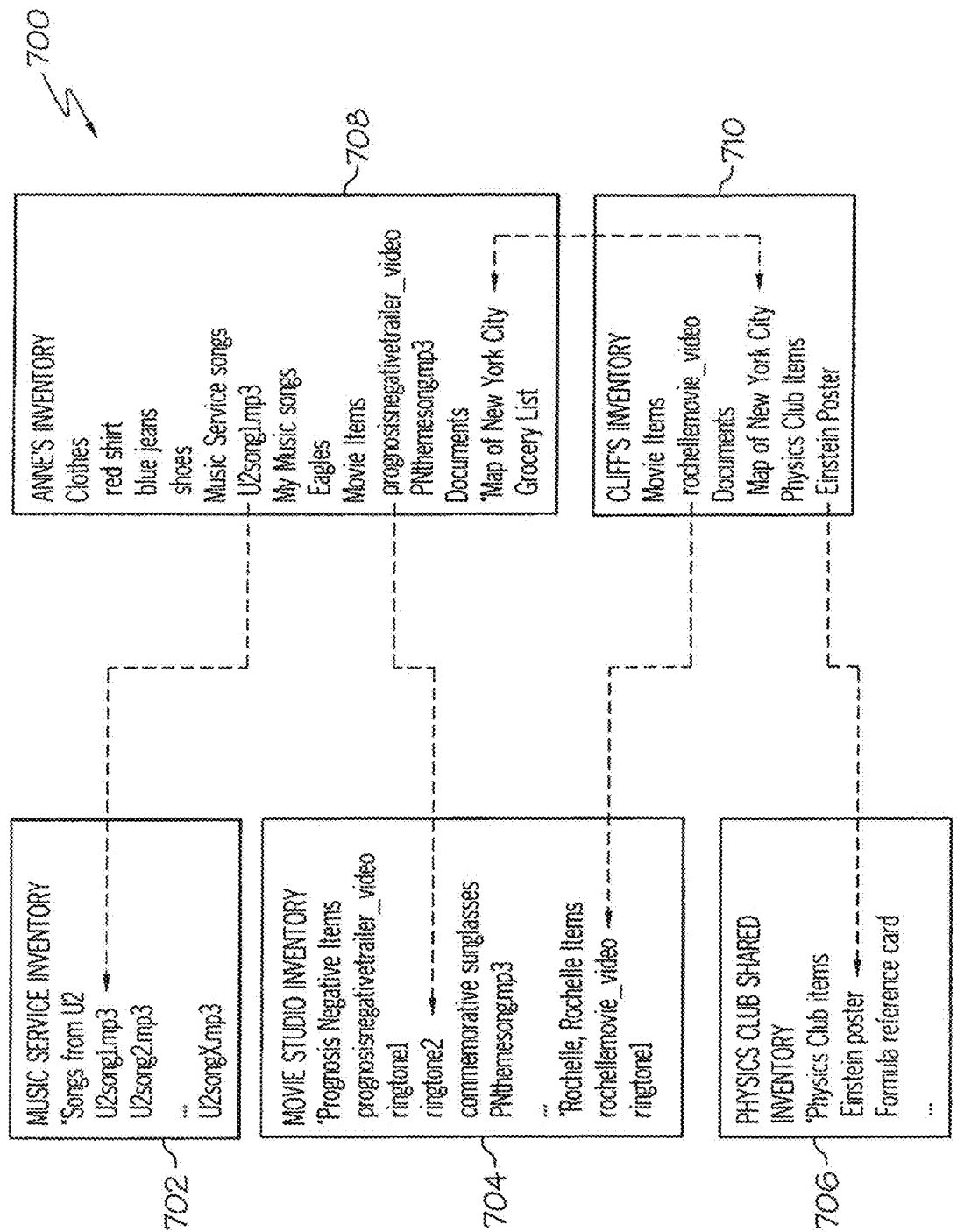
FIG. 7 depicts a schematic representation of inventory source lists and an inventory item list with shared inventory items according to some embodiments.

FIG. 7 depicts a schematic representation of inventory source lists and an inventory item list with shared inventory items according to some embodiments. The inventory item model 700 of FIG. 7 includes a plurality of inventory source lists 702, 704, and 706 as well as two user inventory item lists 708, 710, as well as the relationships between them. Shareable items on any of the lists are marked with a leading asterisk. The inventory lists are also depicted in a hierarchical structure as is utilized according to some embodiments.

Each inventory source list 702, 704, 706 may represent the contents of a particular inventory source, such as VU inventory database 111, distributed inventory database 118, local inventory database 114, etc. Each may also include a variety of folders, sub-folders, or files, some or all of which are marked as shared.

The user inventory item lists 708, 710 may represent the contents of the inventory for particular users of a virtual universe simulator 102. A user may have both shared inventory items and traditional inventory items and the difference between the two may not be visible to the user in some embodiments. In the depicted example, Anne's inventory list 708 has a number of items that are owned by her (e.g., red shirt, blue jeans) but other items that are shared from another source (e.g., U2song1.mp3, prognosisnegativetrailer_video). For these shared items, the inventory list 708 may only have a pointer to the actual location of the content according to some embodiments and the disclosed system may provide the necessary code or other data to render those items as needed. One of Anne's items is also marked as shareable (the map of New York City) and Cliff is sharing that item in his inventory item list 710.

As can be seen from FIG. 7, a single inventory source may thus provide inventory items to a large amount of users and a particular user may have items in the inventory list from a wide variety of inventory sources, provided a flexible and scaleable model for managing shared inventory items.

It will be apparent to those skilled in the art having the benefit of this disclosure that the present invention contemplates methods, systems, and media for managing shared inventory items in a virtual universe. It is understood that the form of the invention shown and described in the detailed description and the drawings are to be taken merely as examples. It is intended that the following claims be interpreted broadly to embrace all the variations of the example embodiments disclosed.

What is claimed is:

1. A method for managing shared inventory in a virtual universe, said method comprising:
    receiving, by a processor of a computer system, an owner request from an owner of an inventory item to designate the inventory item as a shared inventory item renderable in the virtual universe, said owner request specifying terms and conditions under which the inventory item may be shared for use by users other than the owner;

in response to said receiving the owner request, said processor generating metadata comprising the terms and conditions;

said processor establishing a session between a particular user and a virtual universe simulator;

said processor ascertaining that the terms and conditions in the received metadata permit use of the shared inventory item by the particular user from whom a user request to use the shared inventory item had been received by the processor, said particular user not being the owner; and in response to said ascertaining, said processor causing the virtual universe simulator to render the virtual universe and the shared inventory item on the particular user's computer for use of the shared inventory item by the particular user in the virtual universe.

2. The method of claim 1, said method further comprising:
before the user request had been received, said processor receiving an updated list of inventory items, wherein one inventory item on the list is marked with a text character denoting that the one inventory item is shareable with users other than an owner of the one inventory item, and wherein another inventory item on the list is not marked to denote that the another inventory item is shareable with users other than an owner of the another inventory item.

3. The method of claim 1, wherein the terms and conditions in the metadata specify a rating denoting a standard of quality for the shared inventory item and that the shared inventory item may be shared for use by users who specify a desired quality for the shared inventory item not exceeding the standard of quality denoted by the rating.

4. The method of claim 1, wherein the terms and conditions in the metadata specify that the shared inventory item may be simultaneously shared for use by no more than a specified maximum number of users.

5. The method of claim 1, wherein the terms and conditions in the metadata specify that the shared inventory item may be shared for use by different users at different times.

6. The method of claim 1, wherein the terms and conditions in the metadata specify that the shared inventory item may be shared for use only when the owner is not logged on the computer system.

7. The method of claim 1, wherein the terms and conditions in the metadata specify that the shared inventory item may be shared for use during only a specified period of time during each day.

8. The method of claim 1, wherein the terms and conditions in the metadata specify that the shared inventory item may be shared for use by only particular users.

9. The method of claim 1, wherein the terms and conditions in the metadata specify that the shared inventory item may be shared for use in an auction.

10. The method of claim 1, said method further comprising:
before the user request was received, said processor storing the metadata in a database of the computer system; and
after the user request was received and prior to said ascertaining, said processor retrieving the metadata from the database.

11. A computer program product, comprising a computer readable hardware storage device having computer readable program code stored therein, said program code executable by a processor of a computer system to implement a method for managing shared inventory in a virtual universe, said method comprising:

said processor receiving an owner request from an owner of an inventory item to designate the inventory item as a shared inventory item renderable in the virtual universe, said owner request specifying terms and conditions under which the inventory item may be shared for use by users other than the owner;

in response to said receiving the owner request, said processor generating metadata comprising the terms and conditions;

said processor establishing a session between a particular user and a virtual universe simulator;

said processor ascertaining that the terms and conditions in the received metadata permit use of the shared inventory item by the particular user from whom a user request to use the shared inventory item had been received by the processor, said particular user not being the owner; and in response to said ascertaining, said processor causing the virtual universe simulator to render the virtual universe and the shared inventory item on the particular user's computer for use of the shared inventory item by the particular user in the virtual universe.

12. The computer program product of claim 11, said method further comprising:
before the user request had been received, said processor receiving an updated list of inventory items, wherein one inventory item on the list is marked with a text character denoting that the one inventory item is shareable with users other than an owner of the one inventory item, and wherein another inventory item on the list is not marked to denote that the another inventory item is shareable with users other than an owner of the another inventory item.

13. The computer program product of claim 11, wherein the terms and conditions in the metadata specify a rating denoting a standard of quality for the shared inventory item and that the shared inventory item may be shared for use by users who specify a desired quality for the shared inventory item not exceeding the standard of quality denoted by the rating.

14. The computer program product of claim 11, wherein the terms and conditions in the metadata specify that the shared inventory item may be simultaneously shared for use by no more than a specified maximum number of users.

15. The computer program product of claim 11, wherein the terms and conditions in the metadata specify that the shared inventory item may be shared for use by different users at different times.

16. A computer system comprising a processor, a memory coupled to the processor, and a computer readable hardware storage device coupled to the processor, said storage device containing program code executable by the processor via the memory to implement a method for managing shared inventory in a virtual universe, said method comprising:

said processor receiving an owner request from an owner of an inventory item to designate the inventory item as a shared inventory item renderable in the virtual universe, said owner request specifying terms and conditions under which the inventory item may be shared for use by users other than the owner;

in response to said receiving the owner request, said processor generating metadata comprising the terms and conditions;

said processor establishing a session between a particular user and a virtual universe simulator;

said processor ascertaining that the terms and conditions in the received metadata permit use of the shared inventory item by the particular user from whom a user request to use the shared inventory item had been received by the processor, said particular user not being the owner; and in response to said ascertaining, said processor causing the virtual universe simulator to render the virtual universe and the shared inventory item on the particular user's computer for use of the shared inventory item by the particular user in the virtual universe.

17. The computer system of claim 16, said method further comprising:

before the user request had been received, said processor receiving an updated list of inventory items, wherein one inventory item on the list is marked with a text character denoting that the one inventory item is shareable with users other than an owner of the one inventory item, and wherein another inventory item on the list is not marked to denote that the another inventory item is shareable with users other than an owner of the another inventory item.

18. The computer system of claim 16, wherein the terms and conditions in the metadata specify a rating denoting a standard of quality for the shared inventory item and that the shared inventory item may be shared for use by users who specify a desired quality for the shared inventory item not exceeding the standard of quality denoted by the rating.

19. The computer system of claim 16, wherein the terms and conditions in the metadata specify that the shared inventory item may be simultaneously shared for use by no more than a specified maximum number of users.

20. The computer system of claim 16, wherein the terms and conditions in the metadata specify that the shared inventory item may be shared for use by different users at different times.

* * * * *